April 7, 1970  C. PAGE  3,504,791
EGG GRADING KICK-OFF CONTROL LINKAGE
Filed April 23, 1968
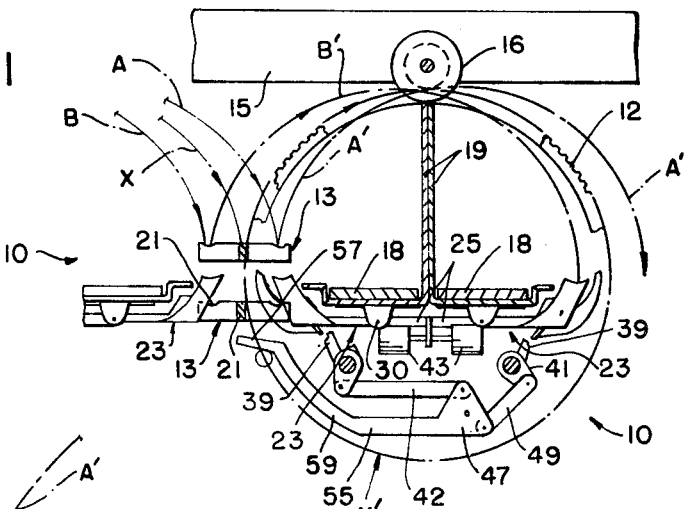
FIG.1
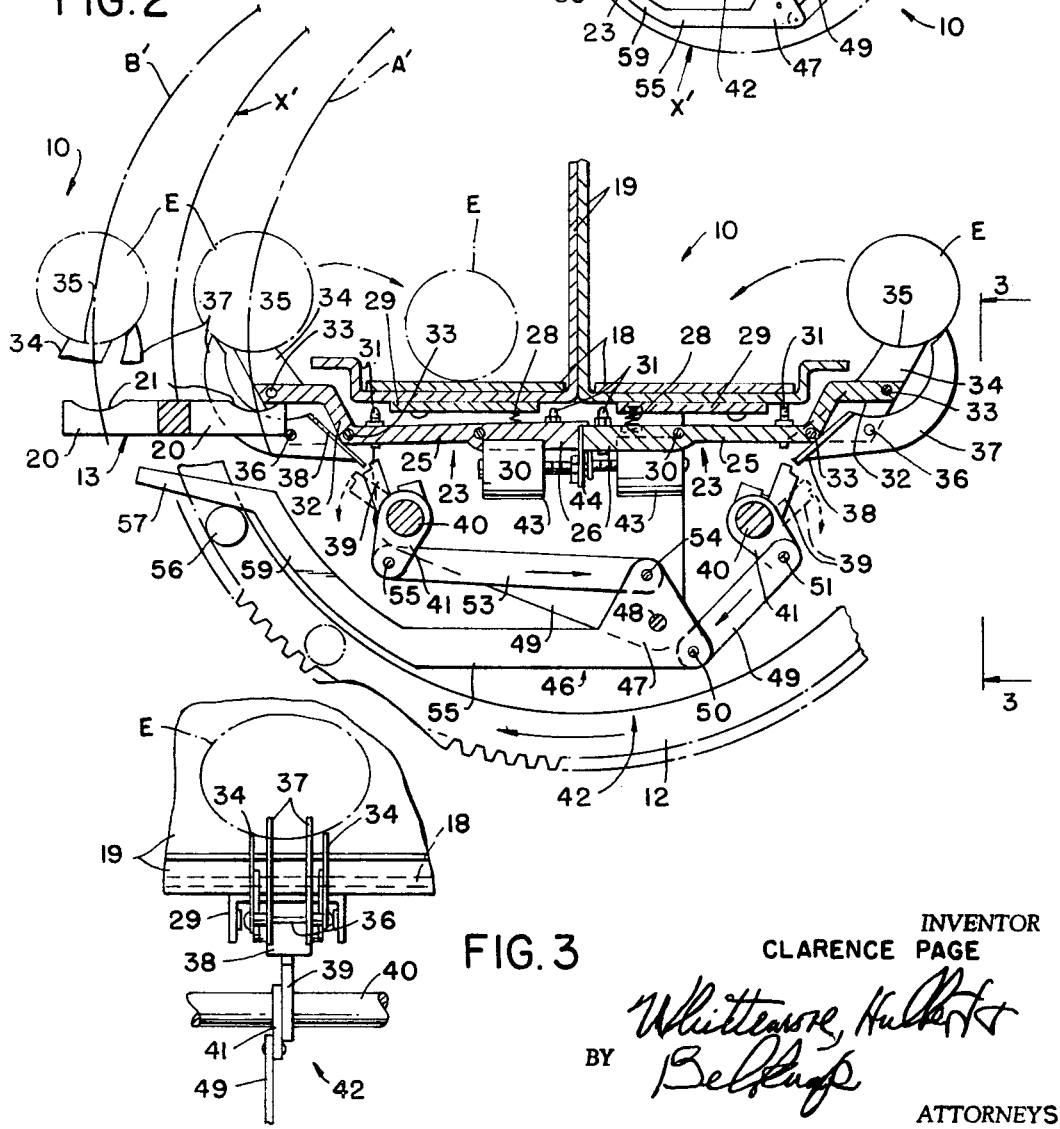
FIG.2
FIG.3
INVENTOR
CLARENCE PAGE
BY Whittemore, Hulbert
 Belknap
ATTORNEYS

United States Patent Office 3,504,791
Patented Apr. 7, 1970

---

3,504,791
EGG GRADING KICK-OFF CONTROL LINKAGE
Clarence Page, Southfield, Mich., assignor to Page and Cox, Detroit, Mich., a partnership
Continuation-in-part of application Ser. No. 642,051, May 29, 1967, now Patent No. 3,426,894. This application Apr. 23, 1968, Ser. No. 723,517
Int. Cl. B07b 13/08
U.S. Cl. 209—74      9 Claims

---

ABSTRACT OF THE DISCLOSURE

Rows of transversely aligned eggs are transported and successively deposited by an orbital transfer bar onto rows of opposed scale beam weighing units. Eggs of a given weight are displaced by parallel rows of oppositely acting, oscillatory kick-off members onto a pair of transversely traveling conveyor belts paralleling and between the scale beam rows; and a linkage common to the sets of fingers is operated by a tappet on the transfer bar unit, on each orbital cycle of the latter, to trip the finger linkage and displace eggs of proper weight onto the belts. The linkage includes two sets of crank operated trip fingers and links connecting their cranks to a common actuator therebetween; and the actuator is in the form of an elongated rocker arm having an operating tail or extension periodically engaged by the orbiting transfer bar tappet to operate the sets of kick-off members.

---

This is a continuation-in-part of my copending application, Ser No. 642,051, filed May 29, 1967 and now U. S. Patent No. 3,426,894.

CROSS-REFERENCE TO RELATED APPLICATIONS

My copending application identified above illustrates and describes egg grading apparatus of the type to which the improvement of the present invention pertains. It is contemplated that all of the kick-off members of an installation according to that application shall be equipped with the improved type of multiple control linkage which is the subject matter of the present application.

BACKGROUND OF THE INVENTION (1) Field of the invention

As in the case of my said application, the improved egg kick-off linkage finds primary application in the commercial egg grading field, for example, in an egg grading and packing department of a food purveyor plant in which eggs are received in crates, cleaned, candled, weighed and otherwise graded prior to being cartoned for further distribution, or at poultry farm equipped with modern means to perform these operations.

(2) Description of the prior art

The patents to Page No. 2,731,146 of Jan. 17, 1956, and Page et al. No. 2,998,969 of Sept. 5, 1961, deal with egg grading equipment of the general type herein involved. However, neither these graders nor that of my copending application mentioned above disclose coordinated dual-linkage to operate egg kick-off fingers, as herein disclosed.

SUMMARY OF THE INVENTION

The invention affords improved and highly simple linkage means which, as operated cyclically by a tappet on a ring gear supporting an egg transfer bar for circular orbital travel, produces simultaneous and coordinated actions in opposite circumferential directions of a pair of trip fingers, each associated with and beneath one of two successive scale beam weigher units. Each such unit has a transverse row of egg receiving seats onto which eggs are deposited by the orbiting transfer bar; and a pivotally acting kick-off member or arm is mounted behind the scale beam of each weigher unit, the kick-off members of the respective weighing beams being adapted to swing in opposite directions past the beam's egg supporting seats. If an egg is of sufficient weight to counterpoise any given beam, a portion of the kick-off member associated with that beam is engaged by the corresponding trip finger and the egg is displaced laterally onto a transversely acting egg removal conveyor belt. In the event the egg is of insufficient weight, the tripping action does not take place and such egg remains on the scale beam seat in question, to be removed therefrom and transported orbitally by the transfer bar for grading by a succeeding weigher unit. Apparatus of this general sort is illustrated and described in the patents and application identified above.

In accordance with the invention, the linkage adapted to coordinately operate the trip fingers of a pair of adjacent weighers comprises a rocker appropriately pivoted on a horizontal transverse axis beneath the weigher unit; and this rocker is operatively connected by oppositely extending links to a pair of crank elements each of which moves pivotally with one of the trip fingers referred, the links being pivotally connected at opposite ends thereof to the rocker and to the cranks.

Moreover, the rocker has an improvement in the form of a considerably elongated operating tail or extension integral therewith, which tail projects generally horizontally into the path of movement of an orbiting transfer bar. The operating tail is specially contoured at an elongated arcuate portion thereof, which portion parallels and lies radially within the orbital path of the transfer bar. The tail terminates in an offset finger which is actually engaged by a tappet on the transfer ring gear to actuate the linkage. However, in the arcuate zone of the tail the tappet passes clear of any part of the rocker.

The result is that actuation of the linkage is delayed for a considerable length of time, as the ring gear, transfer bar and tappet partake of their circular travel. This additional time factor enables the eggs, upon being deposited by a preceding transfer bar on the scale beam seats, to come stably to rest, whether the beam is counterpoised or not counterpoised by the eggs, before the actual tripping of the kick-off member or arm takes place, assuming the egg to be of sufficient weight. The further result is that weighing accuracy is greatly enhanced. Actually, the stabilizing effect compares with that of dashpot means, but is made possible by a very simple and much less inexpensive linkage arrangement.

BRIEF DESCRIPTION OF THE DRAWING

FIG. 1 is a fragmentary, somewhat schematic view sectioned in a longitudinal vertical plane along the length of a succession of transfer bar and weigher units equipped with the improved kick-off control linkage;

FIG. 2 is a fragmentary enlarged scale view in similar section illustrating in greater detail the structural features and operation of the linkage; and FIG. 3 is a fragmentary view in end elevation, as from the line 3—3 of FIG. 2.

DESCRIPTION OF A PREFERRED EMBODIMENT

As more fully illustrated and described in my copending application, the grading apparatus comprises a succession of egg transfer and weighing units 10 (FIG. 1), each comprising an externally toothed ring gear 12. Each of these gears transports a transverse dual-type egg transfer bar 13, which is held horizontal by means of an orbiting control unit (not shown) in sweeping a circular orbital transfer path. This bar is of a type illustrated and described in the above-mentioned patents and application. The latter also show the equivalent of an elongated guide bar 15 (FIG. 1), coextensive in length with the series of units 10, which bar journals guide rolls 16 laterally restraining from above the otherwise cradled and journaled series of transfer bar ring gears 12. The latter are rotatively driven by means not germane to the present invention.

In the manner of my prior application and Patent No. 2,731,146 identified above, such drive source also drives a plurality of coaxial drums (not shown) about which transverse horizontal egg removal conveyor belts 18 are trained. The upper reaches of belts 18 are slidably supported on L-shaped plates 19, which are fixedly supported by suitable means on the frame of the machine.

Each orbiting transfer bar 13 has transversely spaced pairs of egg pick-up fingers 20 projecting from the horizontally opposite sides thereof, so as to receive on the bar a maximum full complement of twenty-four eggs; and each finger 20 has a concave egg cradling seat 21, as described in my co-pending application.

The transfer action of the bars 13 is best illustrated in FIG. 1 in which, assuming the clockwise orbit of the transfer bar associated with the left-hand weigher unit 10 as being in the circular arc X, then the orbital paths of the eggs on its seats 21 are the eccentric arcs A and B, respectively. Similarly, the clockwise orbit of the next or right-hand unit 10 of FIG. 1 is on the arc X' and the orbits of its seats 21 are on arcs A' and B', and so on. Upon completion of the 180° egg transfer in these arcs, rows of eggs remaining on one bar 13 are delivered onto a set of seats (to be described) of an adjacent succeeding scale beam unit, generally designated 23. This occurs identically in the successive orbital actions of several bar units 13 associated with the ring gears 12.

The weigher units or mechanisms 23 of the second and succeeding ring gears 12 of the apparatus are oriented oppositely to one another, as appears in FIG. 2, ejecting or displacing graded eggs in opposite generally horizontal directions onto the removal belts 18. Each adjacent set of adjacent weighers 23 grades eggs for the same weight value.

As best shown in FIGS. 2 and 3, each weigher unit 23 comprises an elongated, longitudinally extending scale beam 25 which is thickened and of square cross-section at 26 on its left-hand end. A small coil spring 28 is seated downwardly into this portion, reacting upwardly against a plate 29 which is bolted or otherwise secured to the horizontal flange of a belt guiding angle 19. The beam 25 is pivotally mounted at 30 by a depending bracket part of the apparatus; and on either side of its pivot 30 each beam 25 is equipped with an adjustable stop or set screw 31 to adjustably limit swing thereof.

The scale beam has an offset at 32, to either side of which there is secured, as by riveting at 33, a sheet metal finger 34 (FIG. 3); and these fingers have arcuate seats 35 onto which an egg E is deposited for weighing by a seat 21 of a preceding orbital transfer bar 13. Similar finger construction, of course, characterizes each set of weighers 23.

Each pair of fingers 34 serves to pivotally mount therebetween, as at 36, an egg ejector or kicker arm also constituted by two arcuate plates 37, as shown in FIG. 3, whose function is to kick onto a conveyor belt 18 any egg which over-poises the associated scale beam 25; and each such kicker arm is provided for the purpose with an offset, plate-like flange 38.

An operating trip finger 39 for each weigher 23 is clamped on an elongated cross shaft 40 appropriately journaled in the side walls of the grading machine, the finger 39 being adapted to be operated, in part through the agency of a small crank 41 also fixed on the shaft 40, in a cyclic movement in accurately timed relation to the movement of the transfer bar unit 13. Cranks 41 may be considered to be elements of the basic linkage means of the invention, generally designated 42, later described.

If an egg on a weigher seat 35 is of less than proper weight, the linkage-operated trip finger 39 will normally pass beneath, and fail to trip, the kicker flange 38, as indicated at the right of FIG. 2. The egg then remains undisplaced from seat 35. However, when an egg of counter-balancing weight is delivered to the seat, beam 25 swings about its pivot at 30, bringing the flange 38 of the beam into the path of trip finger 39. Thus, on the next critical operation of the latter, as shown in reference to the other weigher 23 (FIG. 2), it will strike the flange, swing the associated kicker plates 37 clockwise about their pivot at 36, and discharge the weight-graded egg onto the adjacent removal belt 18.

The scale beam 25 of weigher unit 23 is counterpoised by means of a weight 43 threadedly adjustable on a screw which is fixedly carried by a depending plate 44 applied to the end of each scale beam 25. This permits a quick, accurate and easy adjustment of the counterpoise effect on each of the sets of weighers 23.

As best illustrated in FIG. 2, the improved linkage 42 comprises an oscillatory actuator or rocker, generally designated 46, having a triangular-shaped end 47 at which it is pivoted, as by a transverse pin 48, to a depending bracket 49 fixedly mounted in any suitable manner to the framework of the grading machine. At one apex portion of triangular rocker portion 47 the rocker member 46 is operatively connected by a link 49 to the right-hand operating crank 41 of the linkage. Pivot pins 50 and 51 effect the connection of the link ends. A second apex portion of rocker 46 is pivotally articulated by a somewhat longer link 53 to the crank 41 of the left-hand trip member 39, the pivotal connections being through the agency of pins 54 and 55.

Linkage actuator 46 is completed by an elongated tail or extension 55 integrally extending from its triangular end portion 47, the tail 55 projecting a substantial distance to the left, as shown in FIG. 2, and generally horizontally into the orbital path of a tappet member 56 projecting axially from the ring gear 12; and tappet 56 is engageable upwardly with an offset terminal finger 57 of actuator 46. When this occurs, the latter is swung clockwise (FIG. 2) about its pivot at 48, shifting the links 49 and 53 in the directions indicated by arrows thereon.

In consequence, the right-hand crank 41 is swung clockwise and the left-hand crank 41 is swung counter-clockwise; and the trip arms 39 moving with the cranks partake of corresponding movements of equal arcuate extent, as from the solid line, neutral position of arms 39 appearing in FIG. 2 to or through the dotted-line position. The kick-off members 37 are actuated or not, depending upon the weight of an egg E on a scale beam 35, to displace eggs onto a removal belt 18.

The terminal offset finger 57 of rocker tail 55 is integrally connected to the latter's triangular opposite end through an arcuate length 59 of substantial extent, which is located within and arcuately parallels the ring gear 12. Thus, as best shown in FIG. 2, the tappet 56, in approaching the tail extension 55 clockwise (dot-dash line), travels clear of arcuate tail length 59 before engaging portion 57.

This signifies that a substantial period of time elapses, after an egg E has been deposited upon the associated scale beam seat 35, for scale beam 25 to achieve and maintain a stable equilibrium, before the actuator or rocker 42 is swung clockwise by the tappet about the actuator pivot 48. The improved stability enhances accuracy in weighing, as mentioned above, by means of an exceedingly simple linkage 42, yet without the delay at the time of actual operation of the actuator which would be inherent in a stabilizing cushioning or dashpot arrangement.

What I claim as my invention is:

1. In grading apparatus characterized by having successive scale beam-type article weighing units, including movable means to transport articles from seats on one unit to those of a succeeding unit, and further characterized in that each unit has a kick-off member to displace articles from seats thereof; the improvement in accordance with which a linkage coordinately controls said kick-off members of the respective successive weighing units, said linkage omprising a trip member movably mounted adjacent each kick-off member and adapted to engage the latter to displace an article, an actuator common to said trip members and periodically engaged in the operation of said article transporting means to actuate the linkage, and means operatively connecting said actuator in common to said respective trip members to move the latter for said article displacing action.

2. In egg grading apparatus characterized by having successive scale beam-type egg weighing units, including movable means to transport eggs in an orbital path from seats on one unit to those of a succeeding unit, and further characterized in that each unit has a pivotal kick-off member to displace eggs from seats thereof; the improvement in accordance with which a linkage coordinately controls said kick-off members of the respective successive weighing units, said linkage comprising a trip member pivotally mounted adjacent each kick-off member and adapted to engage the latter to displace an egg, an elongated, pivotally mounted actuator common to said trip members and periodically engaged by tappet means on said article transporting means to actuate the linkage, and a pair of links operatively connecting said actuator to said respective trip members to swing the latter for said article displacing action.

3. The improvement of claim 2, in which the respective kick-off members and the respective trip members are pivotally mounted to swing oppositely of one another.

4. The improvement of claim 1, in which said actuator comprises a pivotally mounted rocker provided with an elongated tail having a terminal portion engageable by said transporting means to actuate the linkage.

5. The improvement of claim 2, in which said actuator comprises a rocker provided with an elongated tail having a terminal portion engageable by said tappet means of said transporting means to actuate the linkage.

6. The improvement of claim 3, in which said actuator comprises a rocker provided with an elongated tail having a terminal portion engageable by said tappet means of said transporting means to actuate the linkage.

7. The improvement of claim 5, in which said actuator tail includes a convexly arcuate intermediate portion of substantial length paralleling and lying radially within said orbital path of said transport means, said intermediate portion being out of position to be engaged by said tappet means in the orbiting of the transport means.

8. The improvement of claim 6, in which said actuator tail includes a convexly arcuate intermediate portion of substantial length paralleling and lying radially within said orbital path of said transport means, said intermediate portion being out of position to be engaged by said tappet means in the orbiting of the transport means.

9. The improvement of claim 6, in which said actuator tail includes a convexly arcuate intermediate portion of substantial length paralleling and lying radially within said orbital path of said transport means, said intermediate portion being out of position to be engaged by said tappet means in the orbiting of the transport means, said links extending oppositely of the pivot of said actuator to pivotal connections to the respective trip members.

References Cited

UNITED STATES PATENTS

| | | | |
|---|---|---|---|
| 2,731,146 | 1/1956 | Page | 209—121 |
| 2,998,969 | 9/1961 | Page et al. | 209—121 X |
| 3,426,894 | 2/1969 | Page | 209—121 |

ALLEN N. KNOWLES, Primary Examiner

U.S. Cl. X.R.

209—121